(12) United States Patent
Sheridan et al.

(10) Patent No.: US 7,078,093 B2
(45) Date of Patent: *Jul. 18, 2006

(54) STRETCH RELEASING PRESSURE SENSITIVE ADHESIVE TAPE AND ARTICLES

(75) Inventors: Margaret M. Sheridan, Woodbury, MN (US); James L. Bries, Cottage Grove, MN (US); Jeffrey D. Malmer, Mahtomedi, MN (US); Audrey A. Sherman, St. Paul, MN (US); David J. Kinning, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/409,361

(22) Filed: Apr. 8, 2003

(65) Prior Publication Data

US 2003/0211317 A1    Nov. 13, 2003

Related U.S. Application Data

(62) Division of application No. 09/612,341, filed on Jul. 6, 2000, now Pat. No. 6,569,521.

(51) Int. Cl.
  *B32B 27/42*    (2006.01)
(52) U.S. Cl. ..................... 428/343; 428/447; 428/40.1; 528/38; 528/28
(58) Field of Classification Search ................ 428/343, 428/447, 40.1; 528/38, 28
  See application file for complete search history.

(56) References Cited

U.S. PATENT DOCUMENTS

| | | | |
|---|---|---|---|
| 4,024,312 A | 5/1977 | Korpman | |
| 5,214,119 A | 5/1993 | Leir et al. | |
| 5,318,835 A | 6/1994 | Sawamoto et al. | |
| 5,409,189 A | 4/1995 | Luhmann | |
| 5,461,134 A | 10/1995 | Leir et al. | |
| 5,512,650 A | 4/1996 | Leir et al. | |
| 5,516,581 A | 5/1996 | Kreckel et al. | |
| 5,672,402 A | 9/1997 | Kreckel et al. | |
| 5,725,923 A | 3/1998 | Luhmann | |
| 5,866,222 A | 2/1999 | Seth et al. | |
| 5,921,514 A | 7/1999 | Schumann | |
| 5,925,459 A | 7/1999 | Zimmermann et al. | |
| 6,001,471 A * | 12/1999 | Bries et al. ................ | 428/343 |
| 6,569,521 B1 | 5/2003 | Sheridan et al. | |
| 6,572,945 B1 * | 6/2003 | Bries et al. ................ | 428/40.1 |

FOREIGN PATENT DOCUMENTS

| | | |
|---|---|---|
| EP | 0 320 676 A2 | 6/1989 |
| EP | 0 957 146 A1 | 11/1999 |
| WO | WO 95/06691 | 3/1995 |
| WO | WO 96/34028 | 10/1996 |
| WO | WO 96/35458 | 11/1996 |
| WO | WO 97/07172 | 2/1997 |
| WO | WO 97/40103 | 10/1997 |
| WO | WO 98/17726 | 4/1998 |
| WO | WO 99/31193 | 6/1999 |

OTHER PUBLICATIONS

Hardman, Silicones, Encyclopedia of Polymer Science and Engineering, vol. 15, 2$^{nd}$ Ed., John Wiley & Sons, (1989), p. 234.*

Satas, *Handbook of Pressure Sensitive Adhesive Technology*, Chapter 21, "Silicone Pressure Sensitive Adhesives," pp. 550-559.

Lin, Shaow B., "New Silicone Pressure-Sensitive Adhesive Technology," Int. J. Adhesion and Adhesives, vol. 14, No. 3, pp. 185-191 (1994).

* cited by examiner

*Primary Examiner*—Kuo-Liang Peng
(74) *Attorney, Agent, or Firm*—David B. Patchett (57) ABSTRACT

A stretch releasing pressure sensitive adhesive tape includes a silicone pressure sensitive adhesive composition that exhibits a 180° peel strength on a glass substrate at 98% relative humidity of at least about 5.47 N/dm and a non-tacky tab. A stretch releasing pressure sensitive adhesive tape includes a pressure sensitive adhesive composition having a modulus at 1 radian/second and −17° C. of no greater than about $1\times10^7$ Pa and a non-tacky tab.

34 Claims, 3 Drawing Sheets

STRETCH RELEASING PRESSURE SENSITIVE ADHESIVE TAPE AND ARTICLES

CROSS-REFERENCE TO RELATED APPLICATIONS

This is a division of U.S. application Ser. No. 09/612,341, filed Jul. 6, 2000, now U.S. Pat. No. 6,569,521.

BACKGROUND

The invention relates to. stretch releasing adhesive tape.

Stretch releasing adhesive tapes are often used to bond to a substrate and then release from the substrate upon stretching. Stretch releasing adhesive tapes are useful in a variety of applications including, e.g., assembling, joining, attaching and mounting applications. The stretch releasing tape can be removed from the substrate by stretching the tape at an angle to the surface of the substrate to which it is bonded.

Many stretch releasing adhesive tapes, once bonded to a substrate, e.g., wallboard, are cleanly removable from the substrate such that there is no visible residue remaining on the substrate and no visible damage to the substrate.

Commercially available stretch releasing adhesive tapes include products sold under the trade designation COMMAND by Minnesota Mining and Manufacturing Company, St. Paul, Minn., and the product sold under the trade designation POWER-STRIPS by Beiersdorf AG, Hamburg, Germany. These products are available as discrete strips in which one end of the strip includes a non-adhesive pull tab to facilitate stretching of the strip during removal.

Stretch releasing adhesive tapes are used in a variety of applications and are applied to a variety of substrates including painted wallboard and finished wood. Available stretch releasing adhesive tapes, however, have difficulty maintaining adhesion to substrates such as ceramic and glass in high humidity environments such as showers, bathrooms and kitchens.

SUMMARY

In one aspect, the invention features a stretch releasing adhesive tape construction that includes a silicone pressure sensitive adhesive composition that exhibits a 180° peel strength on a glass substrate at 98% relative humidity of at least about 5.47 N/dm, and a non-tacky tab. In one embodiment, the pressure sensitive adhesive composition includes a silicone polymer selected from the group consisting of silicone polyurea block copolymers polydiorganosiloxane polymers, and mixtures thereof.

In some embodiments, the pressure sensitive adhesive composition includes a) a silicone polyurea block copolymer comprising the reaction product of i) a polydiorganosiloxane diamine having a molecular weight of at least 5,000 g/mole, and ii) a polyisocyanate, and b) from about 30% by weight to about 70% by weight MQ resin. In other embodiments, the silicone polyurea block copolymer includes the reaction product of a polydiorganosiloxane diamine having a molecular weight of at least 5,000 g/mole, a polyamine, and a polyisocyanate. In one embodiment, the polyamine has a molecular weight no greater than 300 g/mole. In other embodiments, the polydiorganosiloxane diamine has a molecular weight of from about 10,000 g/mole to about 65,000 g/mole. The polydiorganosiloxane diamine can also have a molecular weight of from about 25,000 g/mole to about 50,000 g/mole.

In another embodiment, the silicone polyurea block copolymer includes the reaction product of a polydiorganosiloxane diamine having a molecular weight of from about 10,000 g/mole to about 65,000 g/mole, no greater than 3 moles polyamine (more preferably from about 0.25 moles to 2 moles polyamine), and a polyisocyanate.

In other embodiments, the pressure sensitive adhesive composition includes from about 40% by weight to about 60% by weight MQ resin. In some embodiments, the pressure sensitive adhesive composition includes from about 45% by weight to about 55% by weight MQ resin.

In some embodiments, the pressure sensitive adhesive composition exhibits a. 180° peel strength on a glass substrate at 98% relative humidity of at least about 21.9 N/dm. In another embodiment, the pressure sensitive adhesive composition exhibits a 180° peel strength on a glass substrate at 98% relative humidity of at least about 32.8 N/dm.

In some embodiments, the pressure sensitive adhesive composition has a modulus at $-17°$ C. of no greater than about $1 \times 10^7$ Pa. In other embodiments, the pressure sensitive adhesive composition has a modulus at 1 radian/second and $-17°$ C. of no greater than about $5 \times 10^6$ Pa. In another embodiment, the pressure sensitive adhesive composition has a modulus at 1 radian/second and $-17°$ C. of no greater than about $2 \times 10^6$ Pa.

In another embodiment, the tape includes a pressure sensitive adhesive foam.

In other embodiments, the tape further includes a backing and the pressure sensitive adhesive composition is disposed on the backing. In one embodiment, the backing is selected from the group consisting of elastic backings, highly extensible backings, and substantially inelastic backings, and combinations thereof. In another embodiment, the backing includes a film selected from the group consisting of single layer, multi-layer, woven, non-woven and porous films, and combinations thereof. In other embodiments, the backing includes a layer of polymeric film and a layer of polymeric foam. In another embodiment, the backing includes a layer of foam, a first film disposed on a first surface of the foam and a second film disposed on a second surface of the foam.

In some embodiments, the backing includes a treated surface, the pressure sensitive adhesive composition is disposed on the treated surface of the backing and exhibits greater adhesion to the treated backing relative to an untreated backing.

In another embodiment, the tape further includes a primer composition disposed between the pressure sensitive adhesive composition and the backing.

In other embodiments, a pressure sensitive adhesive composition is disposed on a first major surface of the backing and a second major surface of the backing opposite the first major surface.

In one embodiment, when a first substrate is bonded to a second substrate through the stretch releasing pressure sensitive adhesive tape, the stretch releasing pressure sensitive adhesive tape is capable of completely separating from one of the first substrate or the second substrate prior to completely separating from the other of the first substrate or the second substrate.

In another aspect, the invention features a stretch releasing pressure sensitive adhesive tape construction that includes a pressure sensitive adhesive composition having a modulus at $-17°$ C. of no greater than about $1 \times 10^7$ Pa, and a non-tacky tab. In some embodiments, the pressure sensitive adhesive composition has a modulus at 1 radian/second and $-17°$ C. of no greater than about $5 \times 10^6$ Pa. In other embodiments, the pressure sensitive adhesive composition has a modulus at 1 radian/second and −17° C. of no greater than about $2 \times 10^6$ Pa. In one embodiment, the pressure sensitive adhesive composition includes a silicone polymer.

In some aspects, the invention features an assembly that includes a device for holding an article and an above-described stretch releasing pressure sensitive adhesive tape disposed on a surface of the device. In one embodiment, the device is capable of holding an article selected from the group consisting of razor, bottle, bar of soap and combinations thereof.

In other aspects, the invention features a method of removably bonding an above-described assembly to a substrate. The method includes contacting the substrate with the stretch releasing pressure sensitive adhesive tape such that the device is bonded to the substrate through the stretch releasing pressure sensitive adhesive tape and the non-tacky tab is available for grasping by a user. In one embodiment, the method further includes pulling the tab such that the pressure sensitive adhesive tape stretches and releases from at least one of the device and the substrate. In some embodiments, the method includes removably bonding the assembly to a substrate selected from the group consisting of glass, ceramic, porcelain and combinations thereof. In other embodiments, the substrate is disposed in a high humidity environment. In another embodiment, the substrate is in a location selected from the group consisting of a shower, a steam room, a bathtub, and a refrigerator. In one embodiment, the substrate is in a location selected from the group consisting of a refrigerator and a portable cooler.

In still other aspects, the invention features a multi-layer pressure-sensitive adhesive tape that includes a) a backing that includes a foam substrate, b) a first silicone pressure-sensitive adhesive composition disposed on a first surface of the backing, the first pressure-sensitive adhesive composition exhibiting a 180° peel strength to a glass substrate at 98% relative humidity of at least about 5.47 N/dm, and c) a second pressure-sensitive adhesive composition disposed on a second surface of the backing. In one embodiment, the backing of the multi-layer pressure-sensitive adhesive tape further includes a first polymeric film bonded to a first surface of the foam substrate and a second polymeric film bonded to a second surface of the foam substrate opposite the first surface.

In another aspect, the invention features a kit that includes a device for holding an article and a stretch releasing pressure sensitive adhesive tape capable of forming a bond to a surface of the device and to a substrate, the tape including a silicone pressure sensitive adhesive composition that exhibits a 180° peel adhesion to a glass substrate at 98% relative humidity of at least about 5.47 N/dm. In some embodiments, the stretch releasing adhesive tape further includes a non-tacky tab. In other embodiments, the pressure sensitive adhesive composition includes a silicone polymer selected from the group consisting of silicone polyurea block copolymers, polydiorganosiloxane polymers, and mixtures thereof. In one embodiment, when the device is bonded to a substrate through the stretch releasing pressure sensitive adhesive tape, the stretch releasing pressure sensitive adhesive tape is capable of completely separating from one of the device or the substrate prior to completely separating from the other of the device or the substrate.

In some aspects, the invention features a kit that includes a device for holding an article and a stretch releasing pressure sensitive adhesive tape capable of forming a bond to a surface of the device and to a substrate, the tape including a pressure sensitive adhesive composition having a modulus at 1 radian/second and −17° C. of no greater than about $1 \times 10^7$ Pa.

The invention features a stretch releasing adhesive tape that can maintain a bond to silacious substrates including, e.g., glass, ceramic, porcelain and glass-like substrates, in high humidity and wet environments, e.g., bathroom, shower, kitchen and pool areas. The stretch releasing adhesive tape can also be formulated to form and maintain a bond to a substrate at relatively low temperatures, and is well suited to applications in low temperature environments including, e.g., outdoor mounting in cooler weather and mounting in refrigerators.

The stretch releasing pressure sensitive adhesive tape also exhibits good UV resistance and is suitable for use in applications where there is possible UV exposure including, e.g., windows, outdoor applications and automobiles.

In some embodiments, the stretch releasing adhesive tape removes cleanly from a variety of substrates including, e.g., glass, ceramic, and painted wallboard, without damage to the substrate. The stretch releasing pressure sensitive adhesive tape exhibits good adhesion to a broad range of surfaces and substrates, is conformable to rough surfaces, and can be formulated to exhibit high load shear properties and rapid adhesion build. The stretch releasing pressure sensitive adhesive tape can also be constructed to completely separate from a first substrate to which it is bonded prior to completely separating from a second substrate to which it is bonded.

Other features of the invention will be apparent from the following description of preferred embodiments thereof, and from the claims.

BRIEF DESCRIPTION OF THE DRAWINGS

FIG. 3b is a sectional side view of a partially stretched tape of FIG. 3a.

DETAILED DESCRIPTION

Figure 1:
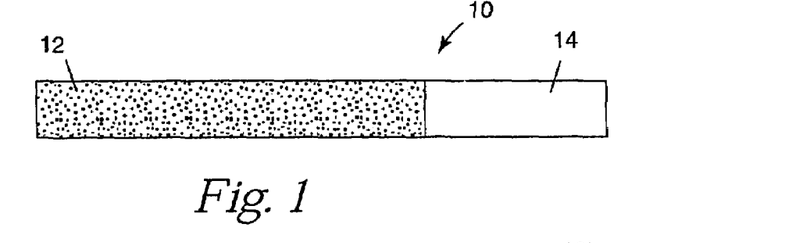
FIG. 1 is a top view of a stretch releasing pressure sensitive adhesive tape with a non-tacky tab.
Figure 2:
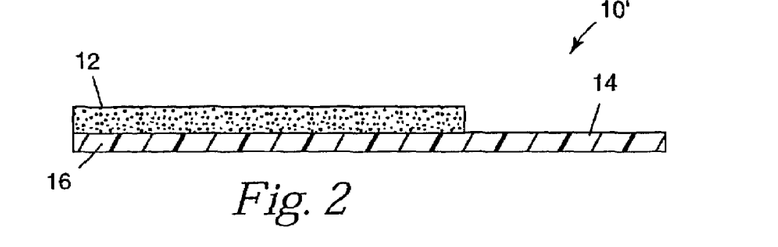
FIG. 2 is a side view of a stretch releasing pressure sensitive adhesive tape that includes a backing.
Figure 3A:
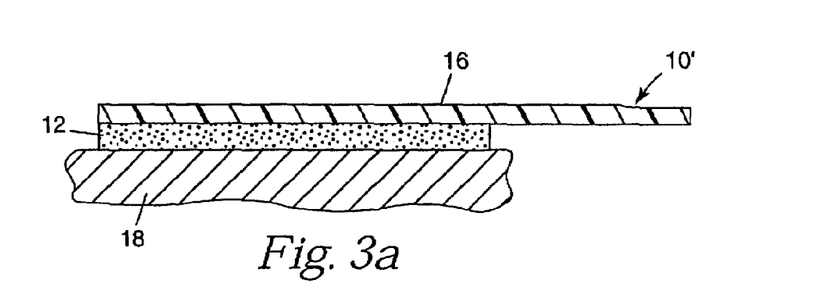
FIG. 3a is a side view of the stretch releasing pressure sensitive adhesive tape of FIG. 2 adhered to a substrate.
Figure 3B:
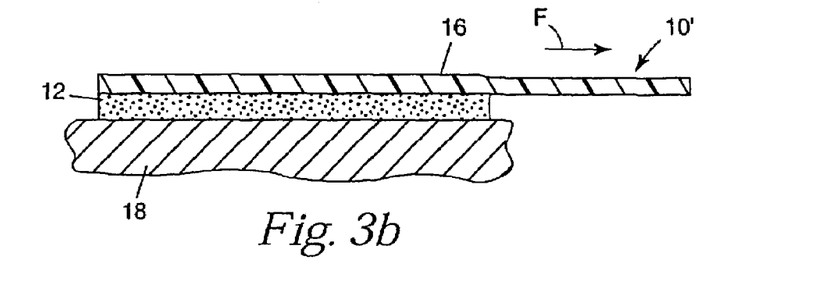
Figure 3C:
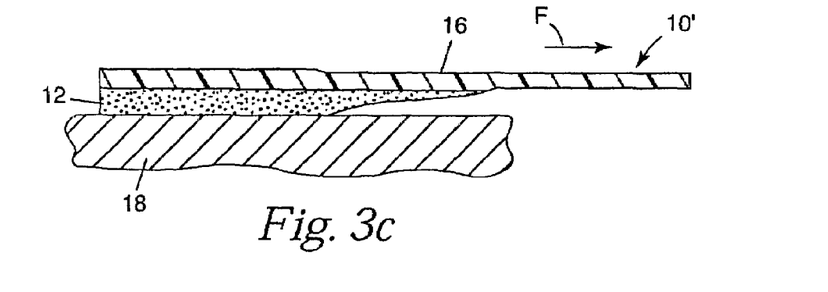
FIG. 3c is a sectional side view of a further stretched tape of FIG. 3b.

Referring to the Figures, wherein like numerals are used to designate the features throughout and first to FIG. 1, there is shown a stretch releasing pressure sensitive adhesive tape 10 that includes a stretch releasing pressure sensitive adhesive composition 12 and a non-tacky tab portion 14. FIGS. 2 and 3 illustrate a stretch releasing pressure sensitive adhesive tape 10' that includes a stretch releasing pressure sensitive adhesive composition 12 disposed on a backing 16.

Figure 4:
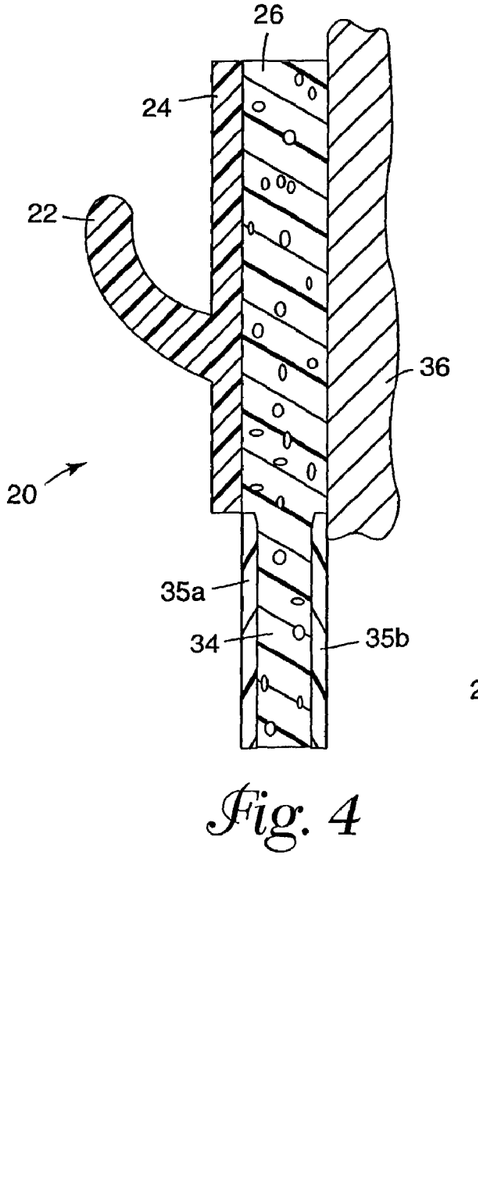
FIG. 4 is a sectional side view of a mounting hook bonded to a substrate through a stretch releasing pressure sensitive adhesive tape.
Figure 5:
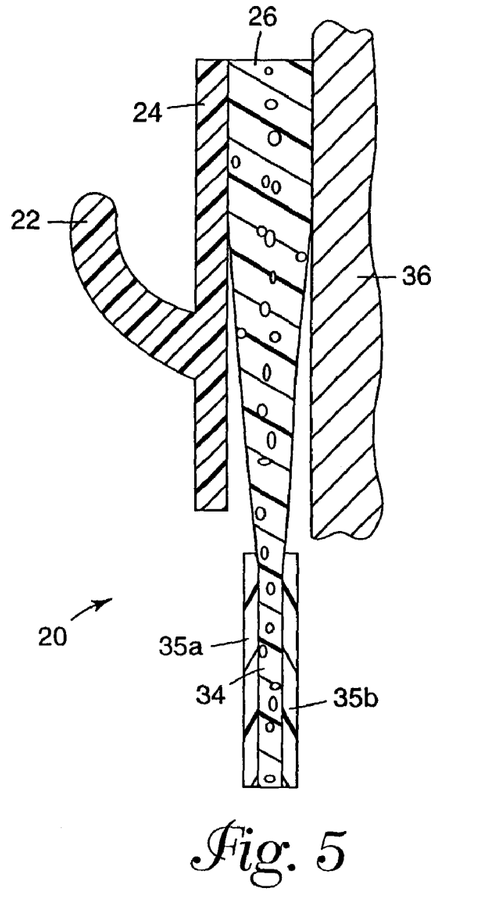
FIG. 5 is a sectional side view of a partially stretched tape of the assembly of FIG. 4.

Alternatively, the stretch releasing pressure sensitive adhesive composition can be used without a backing as illustrated in FIGS. 4 and 5.

The stretch releasing pressure sensitive adhesive tape is capable of forming a bond with a substrate and maintaining adhesion to the substrate in high humidity environments. The pressure sensitive adhesive composition can be formulated to exhibit a desired 180° peel strength to a glass substrate at room temperature and 98% relative humidity. Preferably the pressure sensitive adhesive composition exhibits a 180° peel strength to a glass substrate at room temperature and 98% relative humidity of at least about 5.47 N/dm (5 oz/in). The pressure sensitive adhesive composition can also be formulated to exhibit a 180° peel strength to a glass substrate at room temperature and 98% relative humidity of at least about 21.89 N/dm (20 oz/in) or at least about 32.83 N/dm (30 oz/in).

The stretch releasing pressure sensitive adhesive tape is preferably formulated to form and maintain a bond to a substrate at low temperatures. One measure of the pressure sensitive adhesive property of a composition is shear storage modulus. Preferred pressure sensitive adhesive compositions have a shear storage modulus at 1 radian/second and −17° C. no greater than about $1 \times 10^7$ Pa, preferably no greater than about $5 \times 10^6$ Pa, more preferably no greater than $2 \times 10^6$ Pa, most preferably no greater than $5 \times 10^5$ Pa.

The pressure sensitive adhesive tape is extensible, stretchable and preferably cleanly removable (i.e., does not leave a visible residue) from a variety of substrates including, e.g., glass, ceramic, painted wallboard, and finished, e.g., stained and varnished, wood. The pressure sensitive adhesive tape, after having been bonded to a substrate, is also capable of being removed from the substrate without damaging the substrate.

Examples of suitable pressure sensitive adhesive compositions include silicone-based adhesive compositions.

Useful silicone-based pressure sensitive adhesive compositions include a MQ tackifying resin and a silicone polymer. The MQ tackifying resin and the silicone polymer can be present in the form of, e.g., a blend of MQ tackifying resin and silicone polymer, a reaction product of MQ tackifying resin and silicone polymer, e.g., a condensation cure or addition cure type reaction product, or a mixture thereof. Preferably the silicone polymer is present in the silicone-based pressure sensitive adhesive composition in an amount of from about 30% by weight to about 70% by weight, more preferably 35% by weight to 65% by weight. The MQ tackifying resin is present in the silicone-based pressure sensitive adhesive composition in an amount of from about 30% by weight to about 70% by weight, preferably from about 40% by weight to about 60% by weight, more preferably 45% by weight to 55% by weight.

Useful MQ tackifying resins include, e.g., MQ silicone resins, MQD silicone resins, and MQT silicone resins, which also may be referred to as copolymeric silicone resins and which preferably have a number average molecular weight of about 100 to about 50,000, more preferably about 500 to about 20,000 and generally have methyl substituents. The MQ silicone resins include both non-functional and functional resins, the functional resins having one or more functionalities including, for example, silicon-bonded hydrogen, silicon-bonded alkenyl, and silanol.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. Nos. 2,676,182; 3,627,851; 3,772,247; and 5,248,739, and incorporated herein. MQ silicone resins having functional groups are described in U.S. Pat. No. 4,774,310, which describes silyl hydride groups, U.S. Pat. No. 5,262,558, which describes vinyl and trifluoropropyl groups, and U.S. Pat. No. 4,707,531, which describes silyl hydride and vinyl groups, each of which is incorporated herein. The above-described resins are generally prepared in solvent. Dried or solventless MQ silicone resins are prepared as described in U.S. Pat. Nos. 5,319,040; 5,302,685; and 4,935,484, and incorporated herein.

MQD silicone resins are terpolymers having $R'_3 SiO_{1/2}$ units (M units), $SiO_{4/2}$ units (Q units), and $R'_2Si_{2/2}$ units (D units) as described, e.g., in U.S. Pat. No. 5,110,890 and Japanese Kokai HEI 2-36234, and incorporated herein.

MQT silicone resins are terpolymers having $R_3SiO_{1/2}$ units (M units), $SiO_{4/2}$ units (Q units), and $RSiO_{3/2}$ units (T units) (MQT resins).

Commercially available MQ resins include SR-545 MQ resin in toluene available from General Electric Co., Silicone Resins Division (Waterford, N.Y.), MQOH resins which are MQ silicone resins in toluene available from PCR, Inc. (Gainesville, Fla.). Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent non-volatile content. The MQ silicone resin can also include blends of two or more silicone resins.

One example of a useful class of silicone polymers is silicone polyurea block copolymers. Silicone polyurea block copolymers include the reaction product of a polydiorganosiloxane diamine (also referred to as silicone diamine), a diisocyanate, and optionally an organic polyamine. Suitable silicone polyurea block copolymers are represented by the repeating unit:

wherein each R is a moiety that, independently, is an alkyl moiety, preferably having about 1 to 12 carbon atoms, and may be substituted with, for example, trifluoroalkyl or vinyl groups, a vinyl radical or higher alkenyl radical preferably represented by the formula $R^2(CH_2)_aCH=CH_2$ wherein $R^2$ is $—(CH_2)_b—$ or $—CH_2)_cCH=CH—$ and a is 1, 2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety preferably having from about 6 to 20 carbon atoms and may be substituted with, for example, alkyl, cycloalkyl, fluoroalkyl arid vinyl groups or R is a perfluoroalkyl group as described in U.S. Pat. No. 5,028,679, and incorporated herein, or a fluorine-containing group, as described in U.S. Pat. No. 5,236,997 and incorporated herein, or a perfluoroether-containing group, as described in U.S. Pat. Nos. 4,900,474 and 5,118,775 and incorporated herein; preferably at least 50% of the R moieties are methyl radicals with the balance being monovalent alkyl or substituted alkyl radicals having from 1 to 12 carbon atoms, alkenylene radicals, phenyl radicals, or substituted phenyl radicals;

each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylcne, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical preferably having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof;

m is a number that is 0 to about 1000;

n is a number that is at least 1; and p is a number that is at least 10, preferably about 15 to about 2000, more preferably 30 to 1500.

Useful silicone polyurea block copolymers are disclosed in, e.g., U.S. Pat. Nos. 5,512,650, 5,214,119, and 5,461,134, WO 96/35458, WO 98/17726, WO 96/34028, WO 96/34030 and WO 97/40103, and incorporated herein.

Examples of useful silicone diamines used in the preparation of silicone polyurea block copolymers include polydiorganosiloxane diamines represented by the formula (II)

wherein each of R, Y, D, and p are defined as above. Preferably the number average molecular weight of the polydiorganosiloxane diamines is greater than about 700.

Useful polydiorganosiloxane diamines include any polydiorganosiloxane diamines that fall within Formula II above and include those polydiorganosiloxane diamines having molecular weights in the range of about 700 to 150,000, preferably from about 10,000 to about 60,000, more preferably from about 25,000 to about 50,000. Suitable polydiorganosiloxane diamines and methods of manufacturing polydiorganosiloxane diamines are disclosed in, e.g., U.S. Pat. Nos. 3,890,269, 4,661,577, 5,026,890, and 5,276,122, International Patent Publication Nos. WO 95/03354 and WO 96/35458, each of which is incorporated herein by reference.

Examples of useful polydiorganosiloxane diamines include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures and copolymers thereof.

Suitable polydiorganosiloxane diamines are commercially available from, for example, Shin Etsu Silicones of America, Inc., Torrance, Calif., and Huls America, Inc. Preferably the polydiorganosiloxane diamines are substantially pure and prepared as disclosed in U.S. Pat. No. 5,214,119 and incorporated herein. Polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15% by weight based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650 and incorporated herein.

The polydiorganosiloxane diamine component provides a means of adjusting the modulus of the resultant silicone polyurea block copolymer. In general, high molecular weight polydiorganosiloxane diamines provide copolymers of lower modulus whereas low molecular polydiorganosiloxane polyamines provide copolymers of higher modulus.

Examples of useful polyamines include polyoxyalkylene diamines including, e.g., polyoxyalkylene diamines commercially available under the trade designation D-230, D-400, D-2000, D-4000, ED-2001 and EDR-148 from Hunstman Corporation (Houston, Tex.), polyoxyalkylene triamines including, e.g., polyoxyalkylene triamines commercially available under the trade designations T-403, T-3000 and T-5000 from Hunstman, and polyalkylenes including, e.g., ethylene diamine and polyalkylenes available under the trade designations Dytek A and Dytek EP from DuPont (Wilmington, Del.).

The optional polyamine provides a means of modifying the modulus of the copolymer. The concentration, type and molecular weight of the organic polyamine influence the modulus of the silicone polyurea block copolymer.

The silicone polyurea block copolymer preferably includes polyamine in an amount of no greater than about 3 moles, more preferably from about 0.25 to about 2 moles. Preferably the polyamine has a molecular weight of no greater than about 300 g/mole.

Any polyisocyanate including, e.g., diisocyanates and triisocyanates, capable of reacting with the above-described polyamines can be used in the preparation of the silicone polyurea block copolymer. Examples of suitable diisocyanates include aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl) diphenylmethane, 4,4-diisocyanato-3,3'-dimethoxybiphenyl (o-dianisidine diisocyanate), 5-chloro-2,4-toluene diisocyanate, and 1-chloromethyl-2,4-diisocyanato benzene, aromatic-aliphatic diisocyanates, such as m-xylylene diisocyanate and tetramethyl-m-xylylene diisocyanate, aliphatic diisocyanates such as 1,4- diisocyanatobutane, 1,6-diisocyanatohexane, 1,12-diisocyanatododecane and 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate) and cyclohexylene-1,4-diisocyanate.

Any triisocyanate that can react with a polyamine, and in particular with the polydiorganosiloxane diamine is suitable. Examples of such triisocyanates include, e.g., polyfunctional isocyanates, such as those produced from biurets, isocyanurates, and adducts. Examples of commercially available polyisocyanates include portions of the series of polyisocyanates available under the trade designations DESMODUR and MONDUR from Bayer and PAPI from Dow Plastics.

The polyisocyanate is preferably present in a stoichiometric amount based on the amount of polydiorganosiloxane diamine and optional polyamine.

The silicone polyurea block copolymer can be prepared by solvent-based processes, solventless processes or a combination thereof. Useful solvent-based processes are described in, e.g., Tyagi et al., "Segmented Organosiloxane Copolymers: 2. Thermal and Mechanical Properties of Siloxane-Urea Copolymers," Polymer, vol. 25, December, 1984, and U.S. Pat. No. 5,214,119 (Leir et al.), and incorporated herein by reference. Useful methods of manufacturing silicone polyurea block copolymers are also described in, e.g., U.S. Pat. Nos. 5,512,650, 5,214,119, and 5,461,134, WO 96/35458, WO 98/17726, WO 96/34028, and WO 97/40103, and incorporated herein.

Silicone polyurea block copolymer-based pressure sensitive adhesive compositions can also be prepared by solvent-based processes, solventless processes or a combination thereof.

In solvent-based processes, the MQ silicone resin can be introduced before, during or after the polyamines and polyisocyanates have been introduced into the reaction mixture. The reaction of the polyamines and the polyisocyanate is carried out in a solvent or a mixture of solvents. The solvents are preferably nonreactive with the polyamines and polyisocyanates. The starting materials and final products preferably remain completely miscible in the solvents during and after the completion of the polymerization. These reactions can be conducted at room temperature or up to the boiling point of the reaction solvent. The reaction is preferably carried out at ambient temperature up to 50° C.

In substantially solventless processes, the polyamines and the polyisocyanate and the MQ silicone resin are mixed in a reactor and the reactants are allowed to react to form the silicone polyurea block copolymer, which, with the MQ resin, forms the pressure sensitive adhesive composition.

One useful method that includes a combination of a solvent-based process and a solventless process includes preparing the silicone polyurea block copolymer using a solventless process and then mixing silicone polyurea block copolymer with the MQ resin solution in a solvent. Preferably the silicone polyurea block copolymer-based pressure sensitive adhesive composition prepared according to the above-described combination method to produce a blend of silicone polyurea block copolymer and MQ resin.

Another example of a useful class of silicone polymers is polydiorganosiloxane polymers. Suitable polydiorganosiloxane polymers include, e.g., polydimethylsiloxane and polydimethyldiphenylsiloxane polymers having silanol functionality or alkenyl functionality.

The silicone polydiorganosiloxane-based silicone pressure sensitive adhesive compositions can be made by reacting the MQ resin and the polydiorganosiloxane. To achieve such a reaction, two different reaction chemistries have been commonly used: condensation chemistry and addition-cure chemistry.

Briefly, condensation chemistry includes admixing silanol functional MQ tackifying resins that include triorganosiloxy units and $SiO_{4/2}$ units with silanol-endblocked polydiorganosiloxanes as described in, e.g., U.S. Pat. Nos. 2,736,721, 2,814,601, 4,309,520, 4,831,070, 2,857,356, 3,528,940, and 5,308,887, and Great Britain Patent No. 998,232, and incorporated herein. The MQ resin and the polydiorganosiloxane can be intercondensed, which provides intra- and intercondensation within the adhesive composition. Condensation between the copolymeric silicone resin and the polydiorganosiloxane can be effected either in the presence of catalyst at ambient or elevated temperature, or in the absence of catalyst at elevated temperatures.

A silicone pressure sensitive adhesive composition that includes the intercondensation product of a silanol functional polydiorganosiloxane and a silanol functional MQ resin, as discussed above, can optionally include a free radical polymerization catalyst, such as a diaryl peroxide crosslinker, to crosslink the adhesive composition, thereby improving the high temperature shear properties of the silicone pressure sensitive adhesive composition with only a slight loss in peel adhesion as taught in The Handbook of Pressure-Sensitive Adhesive Technology, (Satas, 1982) and incorporated herein.

Silicone pressure sensitive adhesive compositions prepared by addition-cure chemistry generally include polydiorganosiloxanes having alkenyl groups, MQ silicone resins that include $R_3SiO_{1/2}$ and $SiO_{4/2}$ structural units, wherein R is as defined previously having one or more of the following functionalities: silicone-bonded hydrogen, silicone bonded alkenyl groups such as those selected from the group consisting of vinyl, allyl, propenyl and higher alkenyl groups; or silanol, optionally a crosslinking or chain extending agent, and Pt or other noble metal hydrosilation catalyst to effect the curing of the silicone pressure sensitive adhesive composition. Examples of such compositions are found in U.S. Pat. Nos. 3,527,842; 3,983,298; 4,774,297; European Patent Publication Nos. 355,991, and 393,426, and Kokai HEI 2-58587, all incorporated herein.

Wide ranges of commercially available silicone pressure sensitive adhesive compositions are suitable. Examples of such silicone pressure sensitive adhesive compositions include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. Also useful are various blends of silicone pressure sensitive adhesive compositions, such as blends of two different dimethylsiloxane-based silicone pressure sensitive adhesive compositions, as taught in The Handbook of Pressure-Sensitive Adhesive Technology, (Satas, 1982), p. 346, and incorporated herein, or blends of dimethylsiloxane-based silicone pressure sensitive adhesive compositions with dimethylsiloxane/diphenylsiloxane-based pressure sensitive adhesive compositions as described in U.S. Pat. No. 4,925,671 and incorporated herein.

The silicone pressure sensitive adhesive composition can also include additives including, e.g., pigments and fillers.

The stretch releasing pressure sensitive adhesive composition may also include a mixture of a silicone polyurea block copolymer-based pressure sensitive adhesive composition and a silicone polydiorganosiloxane-based pressure sensitive adhesive composition.

The stretch releasing pressure-sensitive adhesive composition can be in the form of a tape disposed on a backing. The backing can include single layer and multi-layer constructions. Useful backings include, e.g., a polymeric foam layer, a polymeric film layer, and combinations thereof.

Suitable polymeric backing materials are disclosed in U.S. Pat. No. 5,516,581 and PCT Application No. WO 95/06691, and incorporated herein.

Representative examples of suitable polymeric backing materials for polymeric foam layers or solid polymeric film layers include polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof. Mixtures or blends of any plastic or plastic and elastomer materials, such as polypropylene/polyethylene, polyurethane/polyolefin, polyurethane/polycarbonate, and polyurethane/polyester, can also be used. Solid polymeric film backings are preferably selected from polyethylene and polypropylene films, with the most preferred materials being unoriented linear low density and ultra low density polyethylene films. An example of a useful linear low density polyethylene film is commercially available under the trade designation XMAX 161.1 from Huntsman Packaging (Chippewa Falls, Wis.).

Polymeric foams can be selected to optimize tape properties such as conformability and resiliency, which are useful when the tape is to be adhered to surfaces having surface irregularities, e.g., painted wallboard. Conformable and resilient polymeric foams are well suited for applications in which the adhesive tape is to be adhered to surfaces having surface irregularities. Such is the case with a typical wall surface. Polymeric foam layers for use in the backing generally will have a density of about 2 to about 30 pounds per cubic foot (about 32 to about 481 kg/m$^3$), particularly in tape constructions where the foam is to be stretched to effect debonding.

Polyolefin foams are preferred plastic polymeric foam layers for the tape backing. Polymeric foam layers are most preferably polyolefin foams available under the trade designations Volextra™ and Volara™ from Voltek, Division of Sekisui America Corporation (Lawrence, Mass.).

Where only one polymeric film or foam layer of a multi-layer backing is intended to be stretched to effect debonding, that layer should exhibit sufficient physical properties and be of a sufficient thickness to achieve that objective.

Polymeric films may be used to increase load bearing strength and rupture strength of the tape. Films are particularly well suited to applications involving adhering smooth surfaces together. A polymeric film layer preferably has a thickness of about 0.4 to about 10 mils, more preferably from about 0.4 to about 6 mils.

The backing can include an elastomeric material. Suitable elastomeric backing materials include; e.g., styrene-butadiene copolymer, polychloroprene (i.e., neoprene), nitrile rubber, butyl rubber, polysufide rubber, cis-1,4-polyisoprene, ethylene-propylene terpolymers (e.g., EPDM rubber), silicone rubber, silicone polyurea block copolymers, polyurethane rubber, polyisobutylene, natural rubber, acrylate rubber, thermoplastic rubbers, e.g., styrene-butadiene block copolymers and styrene-isoprene-styrene block copolymers, and thermoplastic polyolefin rubber materials.

The stretch releasing pressure sensitive adhesive tape can be constructed in a variety of configurations. For example, the tape can include a backing having several distinct layers arranged in a stack and can include alternating layers of elastic, plastic (e.g., polymeric film), foam or adhesive materials and combinations thereof. The backing layers can be bonded to one another according to a variety of methods including, e.g., adhesive, laminating or coextrusion. The stretch releasing pressure sensitive adhesive tape can be single-coated (i.e., at least one pressure-sensitive adhesive composition is disposed on one surface of the backing) or double-coated (i.e., two opposite surfaces of the backing include an adhesive composition). The pressure-sensitive adhesive tape can include a number of different adhesive compositions, a number of layers of the same or different adhesive composition, and combinations thereof, disposed on a single surface of a backing or on multiple surfaces of a backing.

Examples of useful tape and backing constructions are described in U.S. Pat. No. 4,024,312 (Korpman), U.S. Pat. No. 5,516,581 (Kreckel et al.), U.S. Pat. No. 6,001,471 (Bries et al.) and U.S. Pat. No. 6,004,642 (Langford) and PCT International Publication WO 95/06691 and incorporated herein. Other examples of useful tape and backing constructions include splittable layer backings as described in PCT International Publication WO 98/21285 and re-fastenable layer backings as described in PCT International Publication WO 99/31193, all of which are incorporated herein.

The stretch releasing pressure sensitive adhesive tape can include a non-tacky tab, e.g., as illustrated in the Figures, which can be grasped and pulled by a user to stretch the tape during the removal process, so as to remove the tape from the object or substrate to which it has been affixed. The non-tacky tab can be an extension of the backing material or a detackified portion of the stretch releasing pressure sensitive adhesive. The non-tacky tab can be formed from a tacky adhesive substrate using any known method of producing a non-tacky area including, e.g., applying a detackifying material to the adhesive to render it non-tacky.

The stretch releasing pressure sensitive adhesive tape can also include one or more liners disposed on the exposed surface(s) of the pressure sensitive adhesive composition to protect the adhesive until use. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper.

The release liners can be printed with lines, brand indicia, or other information.

The stretch releasing pressure sensitive adhesive tape can be prepared using a variety of common methods for preparing pressure sensitive adhesive tapes. For example, the pressure sensitive adhesive composition can be coated onto a release liner, coated directly onto a backing, or formed as a separate layer (e.g., coated onto a release liner) and then laminated to a backing.

To improve adhesion of the pressure sensitive adhesive composition to the backing, the backing can be pretreated prior to applying, e.g., coating or laminating, the adhesive composition on the backing. Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, or hydroxyethyl methacrylate, or another reactive species of low molecular weight.

Removing the tape from the surface of a substrate is carried out by stretching the tape. Preferably the tape is stretched in a direction substantially parallel to the plane of the substrate surface. More preferably the tape is stretched in a direction up to an angle of about 35° from the surface of the substrate to which it is adhered. Removal at the appropriate angle will result in leaving no visible adhesive residue on the substrate and will prevent the surface from being damaged.

A schematic illustration of debonding of the adhesive from the substrate or removal by stretching is shown in FIGS. 3a–c. FIG. 3a shows a stretch releasing pressure sensitive adhesive tape 10' bonded to a substrate 18. A force (F) is applied in a direction substantially parallel to the surface of the substrate 18. The bonded structure exhibits a relatively high initial resistance to shearing stress. When sufficient force is applied to overcome this resistance, the backing 16 begins to deform as illustrated in FIG. 3b. In FIG. 3c, the backing 16 yields while the adhesive 12 elongates and releases from the substrate 18.

The stretch releasing pressure sensitive adhesive tape is suitable for a variety of applications including, e.g., bonding two substrates together, mounting applications using articles including, e.g., hooks, hangers, and holders, e.g., holders for razors, sponges, shampoo bottles, towels, articles that are located in wet or high humidity environments such as those found in bathrooms, e.g., toilets (including, e.g., toilet tanks), tubs, sinks, and walls, showers, locker rooms, steam rooms, pools, hot tubs, kitchens, e.g., kitchen sinks, dishwashers and back splash areas, refrigerators and coolers, and articles that are used in low temperatures applications including outdoor applications and refrigerators. Useful outdoor applications include bonding articles including, e.g., signage, to outdoor surfaces such as windows and vehicles.

Other useful applications for the stretch releasing pressure sensitive adhesive tape include (1) other mounting applications, such as wall hangings, decorations, e.g., holiday decorations, calendars, posters, body side moldings on vehicles, carrying handles, signing application, e.g., road signs, vehicle markings, transportation markings, and reflective sheeting; (2) joining applications, such as adhering two or more containers, e.g., boxes, for later separation, e.g., closure applications, such as container closures, e.g., box closures, closures for food and beverage containers, and the like, diaper closures, surgical drape closures, etc.; (3) labeling, e.g., removable labels such as notes, price tags or identification labels on containers; (4) medical applications, such as bandages; (5) fastening applications, e.g., fastening one object, e.g., a vase, to another object, e.g., a table or a book shelf; (6) securing applications, e.g., fastening one or more components of a locking mechanism to a substrate, e.g., a child safety lock to a cabinet or cupboard.

FIG. 4, illustrates an embodiment of an article that includes a stretch releasing pressure sensitive adhesive composition in the form of a tape without a backing in a mounting application. Mounting assembly 20 includes a hook portion 22 and a support 24. The support 24 is adhered to the stretch releasing pressure sensitive adhesive tape 26. A tab 34, which includes detackified portions 35a and 35b, is provided to allow grasping of tape 26, in order to facilitate removal of tape 26 from wall 36. Tab 34 can be left exposed or the hook design can be such that tab 34 is concealed by support 24.

The mounting assembly 20 can then be pressed on a wall 36 in the desired location. To remove mounting assembly 20, tab 34 at the bottom of mounting assembly 20 can be pulled in a direction parallel to wall 36. As tape 26 stretches, it slowly releases mounting assembly 20 from the wall as illustrated in FIG. 5.

Figure 6:
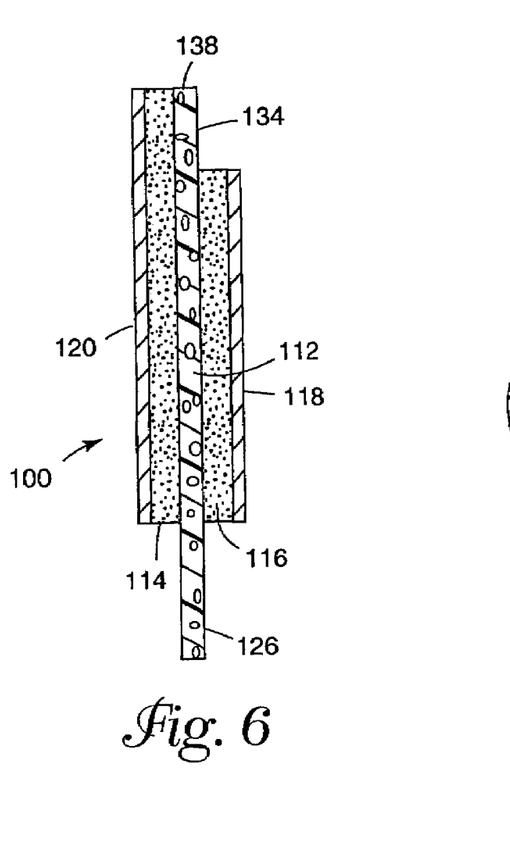
FIG. 6 is a sectional side view of a mounting hook bonded to a substrate though another embodiment of a stretch releasing pressure sensitive adhesive tape.

FIG. 6 illustrates another embodiment of the adhesive tape 100, which is particularly designed for stretching the entire tape 100 to effect debonding and achieving a controlled sequential release, as described in more detail below. The tape 100 includes a foam backing 112, a non-tacky tab 126, and adhesive layers 114 and 116 on opposite surfaces of the backing 112. Adhesive layers 114 and 116 are protected by liners 118 and 120 before the adhesive tape 100 is put into use.

Controlled sequential release can be facilitated using a variety of mechanisms including, e.g., a non-adhesive zone 134, which can be provided by not coating the adhesive composition 116 all the way to the end 138 of the adhesive tape. The liner 118 is coextensive with the adhesive layer 116, although it may extend further to cover the non-adhesive zone 134.

Figure 7:
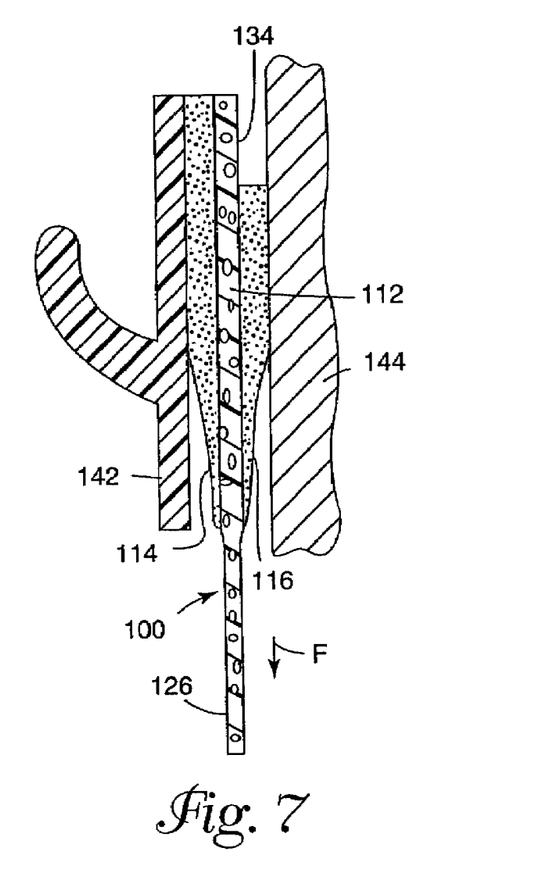
FIG. 7 is a sectional side view of a partially stretched tape of the assembly of FIG. 6.

In FIG. 7 the tape of FIG. 6 has been positioned between and adhered to a hook 142 and a substrate 144, e.g., a wall. The mounting configuration of FIG. 7 will permit a sequential release of the double-sided adhesive tape structure 100 first from the wall 144 and then from the hook 142 during stretch release. The non-adhesive zone 134 prevents bonding in that area and therefore releases the tape 100 from the wall 144 when the stretch release progresses up to the non-adhesive zone 134. The release of adhesive layer 116 progresses with the release of adhesive layer 114 so that a portion of adhesive layer 114 will still be adhered to the hook 142 when the stretch release progresses to the non-adhesive zone 134, at which point the adhesive layer 116 is entirely released then from wall 144.

Other mounting applications involve the use of the stretch releasing pressure sensitive adhesive tape by itself, i.e., without a hook-bearing mounting assembly.

The stretch releasing pressure sensitive adhesive tape can also be a component of an assembly that includes a substrate, e.g., a mounting device, and a stretch releasing pressure sensitive adhesive tape adhered to a surface of the substrate. The assembly can include a release liner disposed on an adhesive surface of the tape that is not in contact with the substrate.

The stretch releasing pressure sensitive adhesive tape can also be a component of a kit that includes, e.g., at least one tape and each tape may have a different property, e.g., dimensions, and at least one device, e.g., hook, holder, hanger, decoration, part, label or a combination thereof, packaged together as a unit.

The invention will now be described further by way of the following examples. All parts, ratios, percents and amounts stated in the Examples are by weight unless otherwise specified.

EXAMPLES

Test Procedures

Test procedures used in the examples include the following.

Stretch Release Test Methods

Debond Force Test Method

A conventional variable angle peel jig is modified to be used with an IMASS adhesion tester (Imass, Inc., Hingham, Mass.) to measure low angle debond forces for adhesive tape adhered to a test surface. The jig can securely hold a 5.08 cm×30.5 cm (2 in×12 in) substrate. The jig is secured to the IMASS platen.

A 1.59 cm×6.99 cm (⅝ in×2.75 in) test sample is adhered to the substrate of interest to provide a bond area of 1.59 cm×5.08 cm (⅝ in×2 in). The test sample has a 1.59 cm×1.91 cm (⅝ in×¾ in) non-adhering tab for clamping to the IMASS tester.

A 1.59 cm×5.08 cm×0.16 cm (¹⁄₁₆ in) high impact polystyrene flat piece is bonded to the side of a test sample opposite the substrate. The test sample is then conditioned for 24 hours under conditions of 50% relative humidity and 22.2° C. and then debonded at a peel speed of 76.2 cm/min (30 in/min) and at a peel angle of 2°.

The average debond force required to stretch the backing for removal from the substrate is recorded in units of ounces per ⅝ in width. Three measurements are made from each substrate and the results are averaged.

% Extension at Debond Test Method

The total extension of the backing, relative to the initial bond length, at the time of complete debond from the adhered substrate is measured with a ruler to determine the % extension at debond according to the following calculation:

$$\% \text{ Extension at Debond} = \frac{AD}{I} * 100$$

where I is the length of the backing prior to debonding (i.e., stretch release), and AD is the length of the backing after debonding (i.e., stretch release).

Three independent determinations are made from each substrate and the results averaged.

Substrate Preparation

Painted Wallboard 0.95 cm (⅜ in) U.S. Gypsum wallboard is painted with Sherwin Williams ProMar 200 interior latex primer. Sherwin Williams Classic 99 interior flat latex wall paint is then painted on the primer. The painted wallboard is aged under ambient conditions at 22° C. for a minimum of 48 hours prior to use in testing.

Clean Removability Test Method

The amount of adhesive residue remaining on the substrate is determined by visual inspection.

Surface Damage Test Method

The occurrence of any damage to the surface of the substrate is determined by visual inspection.

High Humidity Test Method

A test sample is prepared by directly coating an adhesive composition onto a 0.00381 cm (1.5 mil) surface of a polyethylene terephthalate film backing, which has been primed with an aminated polybutadiene, to form an adhesive film having a dry coating thickness of from 0.00381 cm to about 0.00762 cm (1.5 mil to 2.0 mil) onto a 0.00381 cm (1.5 mil) surface of a polyethylene terephthalate film backing that has been primed with an aminated polybutadiene. The exposed adhesive is then placed on a glass substrate and a 2.04 kg (4.5 lb) roller is passed over the polyethylene terephthalate backing four times at a rate of 30.48 cm/min (12 in/min). The test sample is then conditioned for 24 hours at 22.2° C. (72° F.) and greater than 98% relative humidity.

The test sample is then tested according to the 180° Peel Strength Test Method.

180° Peel Strength Test Method

Samples are tested for 180° peel strength tested according to ASTM D3330-87 entitled, "Standard Test Method for Peel Adhesion of Pressure-Sensitive Tape at 180° Angle."

Storage Modulus Test Method I

Test samples are prepared by laminating together several layers of adhesive film to form a test sample having a thickness of about 1 mm.

Storage modulus, G', the loss modulus, G", and the loss factor, tan δ, are determined using a Rheometrics RDA2 (Piscataway, N.J.) and a test mode of dynamic temperature ramp. The parallel plates are 8 mm in diameter. Data is collected at a frequency of 1 radian/second over a temperature range of −80° C. to +200° C. and at a heating/cooling rate of 5° C./minute.

Storage modulus measurements are recorded at −17° C. and a frequency of 1 radian/second.

Storage Modulus Test Method II

Test samples are prepared by laminating together several layers of adhesive film to form a test sample having a thickness of about 1 mm.

Storage modulus, G', the loss modulus, G", and the loss factor, tan δ, are determined using a Polymer Laboratories Dynamic Mechanical Thermal Analyzer (DMTA) Mark II and a technique of multiplexing frequency during a thermal scan, i.e., properties are measured while both frequency and temperature are changing. The shear plates are 8 mm in diameter. The temperature is varied from −120° C. to 200° C. at a rate of 2° C./minute continuous at a strain setting of ×1.

Storage modulus is recorded at −17° C. and a frequency of 0.3 Hz (1.88 radians/second).

Low Temperature Shear Test Method

A 1.91 cm×5.08 cm (¾ in.×2 in.) anodized aluminum tab is bonded to one side of the adhesive tape test sample for the purpose of attaching the load. The test samples and glass substrates are equilibrated at (4.4° C.) 40° F. overnight. A 1.27 cm×1.27 cm (0.5 in×0.5 in) test sample is then adhered to the glass substrate at 4.4° C. (40° F.). The test sample is bonded to the glass substrate by passing a 2.04 kg (4.5 lb) roller over the test sample four times at a rate of 30.48 cm/min (12 in/min). The test sample is allowed to dwell on the substrate for 1 hour and thereafter a 1 kg weight is applied. The time to failure for five samples is recorded in minutes and the average value is reported.

High Temperature High Humidity Shear Test Method

A 1.91 cm×5.08 cm (¾ in.×2 in.) anodized aluminum tab is bonded to one side of the adhesive tape test sample for the purpose of attaching the load. A 1.27 cm×1.27 cm (0.5 in×0.5 in) test sample is then adhered to a glass substrate at 22° C. (72° F.), 50% relative humidity. The test sample is bonded to the glass substrate by passing a 2.04 kg (4.5 lb) roller over the test sample four times at a rate of 30.48 cm/min (12 in/min). The test sample is allowed to dwell on the substrate for 1 hour at 22° C. and 50% relative humidity, placed under conditions of 32.2° C. (90° F.) and 90% relative humidity, and allowed to equilibrate for 10 minutes. Thereafter a 1 kg weight is applied. The time to failure for four samples is recorded in minutes and the average value is reported.

Example 1

A pressure sensitive adhesive composition formulated with 29.6/0/50 (molecular weight (MW) polydimethylorganosiloxane (PDMS) diamine (divided by 1000)/moles polyamine per mole of PDMS diamine/% by weight MQ resin based upon the total weight of the silicone polyurea block copolymer) was prepared as follows.

14.86 parts 29,600 molecular weight PDMS diamine were charged to a glass reactor and mixed with 0 parts polyamine, 39.00 parts toluene and 21.00 parts 2-propanol. 0.13 parts methylene-diphyenlyene-4'-diisocyanate ($H_{12}$MDI) was added to the solution while stirring at room temperature. The isocyanate was added in a stoichiometric amount based upon the amount of diamine, which includes the PDMS diamine and any optional polyamine. The mixture was then stirred for two hours and became viscous. The resulting silicone polyurea block copolymer solution, which had a PDMS diamine/polyamine/polyisocyanate molar ratio of 1:0:1, was mixed with 25.00 parts SR-545 60% MQ silicone resin solution in toluene solution (General Electric Company) to form a pressure sensitive adhesive composition.

Examples 2–7

The pressure sensitive adhesive compositions of Examples 2–7 were prepared according to the method of Example 1 with the exception that the amount of each component was altered to achieve pressure sensitive adhesive compositions formulated with the MW PDMS diamine (/1000)/moles polyamine/% by weight MQ resin set forth in Table 1.

Adhesive Tape Preparation

The pressure sensitive adhesive compositions of Examples 1–7 were each coated at a wet coating thickness of about 0.033 cm to 0.036 cm (13 to 14 mils) on Rexam 10256 release liner (Rexam Release, Bedford Park, Ill.) and immediately dried at 70° C. for 10 minutes to form an adhesive film having a thickness of about 0.00635 cm (2.5 mils).

Multi-Layer Composite Tape Preparation

A 36 mil multi-layer composite foam laminate backing consisting of a polyethylene vinyl acetate copolymer foam having a density of 6 pounds per cubic foot (pcf) laminated between two pieces of 0.0046 cm (1.80 mil) thick linear low-density polyethylene film was treated with a chemical primer prepared according to Example 15 of U.S. Pat. No. 5,677,376 (Groves).

The dried adhesive films prepared in Examples 1–7 were dry laminated to both sides of the primed multi-layer composite foam laminate backing to form a multi-layer composite tape.

Examples 8–10

0.75 weight percent Perkadox PD-505-ps-a dichlorobenzoyl peroxide based upon 100% solid adhesive was added to adhesive solutions and allowed to mix overnight on a roller. The adhesive solution for each example was as follows: Dow Corning Q2-7735 pressure sensitive adhesive ("PSA") (Example 8); General Electric Silicone PSA 518 polydimethyldiphenylsiloxane (Example 9); General Electric Silicone PSA 6574 polydimethyldiphenylsiloxane (Example 10). The adhesive compositions were then coated at 40% solids on Rexam 10256 release liner, immediately dried at 70° C. for 1 minute, and then immediately cured at 165° C. for 2 minutes to form an adhesive film having a thickness of about 0.00635 cm (2.5 mils).

Example 11

1.79% by weight SYL-OFF 4000 catalyst (Dow Corning Corporation, Midland Mich.) based on 100% solid adhesive was added to Dow Corning 7657 polydimethylsiloxane adhesive solution and mixed overnight on a roller. The adhesive solution was then coated at 45% solids on Rexam 10256 release liner, and cured at 140° C. to 150° C. for 5 to 10 minutes to form an adhesive film having a thickness of about 0.00635 cm (2.5 mils).

Multi-Layer Composite Tape Preparation

A 36 mil multi-layer composite foam laminate backing consisting of a polyethylene vinyl acetate copolymer foam having a density of 6 pounds per cubic foot (pcf) laminated between two pieces of 0.0046 cm (1.80 mil) thick linear low-density polyethylene film was treated with a chemical primer prepared according to Example 15 of U.S. Pat. No. 5,677,376 (Groves).

The dried adhesive films prepared in Examples 8–11 were dry laminated to both sides of the primed multi-layer composite foam laminate backing to form a multi-layer composite tape.

The multi-layer composite tapes of Examples 1–11 were tested according to the Debond Force and % Extension at Debond Test Methods. After stretch release, the substrates were inspected for adhesive residue and surface damage. The results are reported in Table 1.

TABLE 1

| Example | Formulation | Substrate | Debond Force | % Extension at Debond | Adhesive Residue | Surface Damage |
|---|---|---|---|---|---|---|
| 1 | 29.6/0/50[a] | Painted wallboard | 71.7 | 502 | None | None |
|   |   | Glass | 62.1 | 471 | Slight | None |
| 2 | 44.5/0/50[a] | Painted wallboard | 69.6 | 479 | None | None |
|   |   | Glass | 64.2 | 498 | None | None |
| 3 | 84.3/0/50[a] | Painted wallboard | 68.8 | 482 | None | None |
|   |   | Glass | 60.4 | 511 | None | None |
| 4 | 44.5/2/50[a] | Painted wallboard | 70.4 | 477 | None | None |
|   |   | Glass | 66.8 | 542 | None | None |
| 5 | 44.5/2/55[a] | Painted wallboard | 73.1 | 508 | None | None |

TABLE 1-continued

| Example | Formulation | Substrate | Debond Force | % Extension at Debond | Adhesive Residue | Surface Damage |
|---|---|---|---|---|---|---|
|   |   | Glass | 79.6 | 529 | None | None |
| 6 | 84.3/3/55[a] | Painted wallboard | 68.4 | 488 | None | None |
|   |   | Glass | 71.1 | 491 | None | None |
| 7 | 29.6/1/50[a] | Painted wallboard | 71.6 | 507 | Slight | None |
|   |   | Glass | 65.6 | 496 | Slight | None |
| 8 | Dow Corning Q2-7735 | Painted wallboard | 68.5 | 465 | None | None |
|   |   | Glass | 73.1 | 509 | Slight | None |
| 9 | GE PSA 518 | Painted wallboard | NT | NT | NT | NT |
|   |   | Glass | 67.6 | 472 | None | None |
| 10 | GE PSA 6574 | Painted wallboard | 73.1 | 500 | None | None |
|   |   | Glass | 70.3 | 473 | None | None |
| 11 | Dow Corning 7657 | Painted wallboard | 70.7 | 460 | None | None |
|   |   | Glass | 70.7 | 478 | None | None |

[a]= MW PDMS(/1000)/moles Dytek A polyamine (DuPont Company (Wilmington, Delaware))/% by weight MQ resin Examples 12–21

The pressure sensitive adhesive compositions of Examples 12–21 were prepared according to the method of Example 1 with the exception that the amount of each component was altered to achieve pressure sensitive adhesive compositions with the MW PDMS diamine(/1000)/moles polyamine/% by weight MQ resin set forth in Table 2.

The pressure sensitive adhesive compositions of Examples 12–21 were coated onto a 0.00381 cm (1.5 mil) surface of a polyethylene terephthalate film backing, which had been primed with an aminated polybutadiene, and then immediately dried at 70° C. for 10 minutes to form adhesive tapes. The thickness of each dried adhesive film was about 0.00508 cm (2 mils).

Examples 22–26

0.75 weight percent Perkadox PD-505-ps-a dichlorobenzoyl peroxide, based upon 100% solid adhesive, was added to an adhesive solution and allowed to mix overnight on a roller to form an adhesive composition. The adhesive solution for each example was as follows: Dow Corning 7355 polydimethylsiloxane PSA (Examples 22); Dow Corning 7358 polydimethylsiloxane PSA (Example 23); Dow Corning Q2-7735 polydimethylsiloxane PSA (Example 24); General Electric PSA 518 polydimethyldiphenylsiloxane PSA (Example 25); General Electric PSA 6574 polydimethyldiphenylsiloxane PSA (Example 26).

The adhesive composition was then coated at 40% solids on a 0.00381 cm (1.5 mil) surface of a polyethylene terephthalate film backing that has been primed with an aminated polybutadiene, immediately dried at 70° C. for 1 minute, and then immediately cured at 165° C. for 2 minutes to form a pressure sensitive adhesive tape having a thickness of about 0.00508 cm (2 mils).

The pressure sensitive adhesive tapes of Examples 12–26 were tested according to the High Humidity Test Method. The results are reported in Table 2.

TABLE 2

| Example | Formulation | Peel Adhesion (oz./in.) |
|---|---|---|
| 12 | 29.6/0/50[a] | 59.9 |
| 13 | 44.5/0/50[a] | 49.4 |
| 14 | 84.3/0/50[a] | 47.5 |
| 15 | 44.5/2/50[a] | 48.2 |
| 16 | 44.5/2/55[a] | 51.8 |
| 17 | 84.3/3/55[a] | 85.0 |
| 18 | 29.6/1/50[a] | 45.5 |
| 19 | 29.6/0.5/50[a] | 54.3 |
| 20 | 29.6/2/50[a] | 49.0 |
| 21 | 84.3/3/50[a] | 69.6 |
| 22 | Dow 7355 | 50.9 |
| 23 | Dow 7358 | 41.4 |
| 24 | Dow 7735 | 47.0 |
| 25 | GE PSA 518 | 36.3 |
| 26 | GE PSA 6574 | 42.8 |

[a]= MW PDMS diamine(/1000)/moles of Dytek A polyamine/% by weight MQ resin

Example 27

A pressure sensitive adhesive composition formulated with 33/0.25/50 MW PDMS diamine(/1000)/moles polyamine/% by weight MQ resin was prepared as follows 14.84 part 33,000 molecular weight PDMS diamine were charged to a glass reactor and mixed with 25.00 parts 60% SR-545 60% MQ silicone resin solution in toluene solution and 0.01 parts Dytek A polyamine. The final solids content was adjusted to 30% by the further addition 39.00 parts toluene and 21.00 parts 2-propanol. 0.15 parts $H_{12}MDI$ was added to the solution, the mixture was stirred at room temperature for two hours and became viscous.

Examples 28–38

The pressure sensitive adhesive compositions of Examples 28–38 were prepared according to the method of Example 27 with the exception that the amount of each component was altered to achieve a pressure sensitive adhesive composition with the MW PDMS diamine/moles polyamine/% by weight MQ resin as set forth in Table 3.

The pressure sensitive adhesive compositions of Examples 27–38 were coated on a Rexam 10256 release liner and then immediately dried at 70° C. for 10 minutes to form adhesive films having a thickness of about 0.00508 cm (2 mils).

The pressure sensitive adhesive films of Examples 27–38 were tested according to Storage Modulus Test Method I. The results are reported in Table 3.

Examples 39–42

0.50 weight percent TS50 2,4-dichlorobenzoyl peroxide based on 100% solid adhesive was added to adhesive solutions and allowed to mix overnight on a roller. The adhesive solutions were as follows: General Electric PSA 518 polydimethyldiphenyl siloxane (Example 39); General Electric PSA 590 polydimethylsiloxane (Example 40); General Electric PSA 595 polydimethylsiloxane (Example 41); and Dow Corning 280A polydimethylsiloxane PSA (Example 42). The adhesive compositions were coated at 40% solids on Rexam 10256 release liner. The coated adhesive was immediately dried at 70° C. for 1 minute and then immediately cured at 175° C. for 2 minutes to form an adhesive film having a thickness of about 0.00508 cm (2 mils).

Example 43

0.5 weight percent SYL-OFF 7127 catalyst (Dow Corning Corporation) based on 100% solid adhesive was added to Dow Corning 7656 polydimethylsiloxane adhesive solution and mixed overnight on a roller. The adhesive solution was then coated at 45% solids on Rexam 10256 release liner, and cured at 105° C. for 10 minutes to form an adhesive film having a thickness of about 0.00508 cm (2 mils).

The adhesive films of Examples 39–43 were tested according to Storage Modulus Test Method II. The results are reported in Table 3.

TABLE 3

| Example | Formulation | Shear Storage Modulus (Pa) |
|---|---|---|
| 27 | 33/0.25/50$^b$ | 7.94 × 10$^5$ |
| 28 | 33/0.5/50$^b$ | 1.12 × 10$^6$ |
| 29 | 33/1/50$^b$ | 1.02 × 10$^6$ |
| 30 | 33/2/50$^b$ | 1.62 × 10$^6$ |
| 31 | 33/0.5/50$^c$ | 1.12 × 10$^6$ |
| 32 | 33/2/50$^c$ | 1.02 × 10$^6$ |
| 33 | 5.3/0/50$^b$ | 3.63 × 10$^6$ |
| 34 | 12/0/50$^b$ | 1.35 × 10$^6$ |
| 35 | 22.5/0/50$^b$ | 9.33 × 10$^5$ |
| 36 | 44.5/0/50$^b$ | 7.59 × 10$^5$ |
| 37 | 67.8/0/50$^b$ | 7.94 × 10$^5$ |
| 38 | 84.3/0/50$^b$ | 8.51 × 10$^5$ |
| 39 | GE 518 | 3.63 × 10$^6$ |
| 40 | GE 590 | 2.95 × 10$^6$ |
| 41 | GE 595 | 3.80 × 10$^6$ |
| 42 | Dow 280A | 5.50 × 10$^6$ |
| 43 | Dow 7656 | 3.98 × 10$^6$ |

$^b$= MW PDMS diamine (/1000)/moles Dytek A polyamine/% by weight MQ resin
$^c$= MW PDMS diamine (/1000)/moles ethylene diamine (Aldrich (Milwaukee, Wisconsin))/% by weight MQ resin Examples 44–46

The pressure sensitive adhesive compositions of Examples 44–46 were prepared according to the method of Example 27 with the exception that the amount of each component was altered to achieve a pressure sensitive adhesive composition with the MW PDMS diamine(/1000)/moles polyamine/% by weight MQ resin as set forth in Table 4.

The adhesive compositions of Examples 44–46 were coated on a Rexam 10256 release liner and then immediately dried at 70° C. for 10 minutes to form an adhesive film having a thickness of about 0.00635 cm (2.5 mils).

The adhesive film was dry laminated to both sides of a 0.09144 cm (36 mil) multi-layer composite foam laminate backing consisting of a polyethylene vinyl acetate copolymer foam having a density of 6 pcf laminated between two pieces of 0.0046 cm (1.80 mil) thick linear low-density polyethylene film that had been treated with a chemical primer prepared according to Example 15 of U.S. Pat. No. 5,677,376 (Groves), to form a multi-layer composite tape.

The multi-layer composite tapes of Examples 44–46 were tested according to the Low Temperature Adhesion Test Method. The results are reported in Table 4.

TABLE 4

| Example | Formulation MW PDMS diamine (/1000)/moles DytekA polyamine/% by weight MQ resin | Average Shear (minutes) |
|---|---|---|
| 44 | 33/0.25/50 | 25000+ |
| 45 | 33/0.5/50 | 25000+ |
| 46 | 33/1/50 | 25000+ |

Examples 47–48

The pressure sensitive adhesive composition of Examples 47–48 were prepared according to the method of Example 1 with the exception that the amount of each component was altered to achieve a pressure sensitive adhesive composition with a MW PDMS diamine (/1000)/moles polyamine/% by weight MQ resin as set forth in Table 5.

The pressure sensitive adhesive compositions of Examples 47 and 48 were coated on a Rexam 10256 release liner and then immediately dried at 70° C. for 10 minutes to form an adhesive film having a thickness of about 0.00635 cm (2.5 mils).

The adhesive film was dry laminated to both sides of a 0.09144 cm (36 mil) multi-layer composite foam laminate backing consisting of a polyethylene vinyl acetate copolymer foam having a density of 6 pcf laminated between two pieces of 0.0046 cm (1.80 mil) thick linear low-density polyethylene film that had been treated with a chemical primer prepared according to Example 15 of U.S. Pat. No. 5,677,376 (Groves), to form multi-layer composite tape.

The multi-layer composite tapes of Examples 47 and 48 were tested according to the High Temperature High Humidity Shear Test Method. The results are reported in Table 5.

TABLE 5

| Example | Formulation MW PDMS diamine (/1000)/moles Dytek A polyamine/% by weight MQ resin | Average Shear (minutes) |
|---|---|---|
| 47 | 29.6/0.5/50 | 25000+ |
|  |  | 25000+ |
|  |  | 25000+ |
|  |  | 25000+ |
| 48 | 29.6/1/50 | 25000+ |
|  |  | 25000+ |
|  |  | 25000+ |
|  |  | 25000+ |

Other embodiments are within the following claims.

What is claimed is:

1. A stretch releasing pressure sensitive adhesive tape comprising:
   a pressure sensitive adhesive composition having a modulus at 1 radian/second and −17° C. of no greater than about 1×10$^7$ Pa, said pressure sensitive adhesive composition comprising
   a) a silicone polyurea block copolymer comprising the reaction product of
      i) a polydiorganosiloxane diamine having a molecular weight of at least 5,000 g/mole,
      ii) a polyisocyanate, and
   b) from about 39% by weight to about 70% by weight MQ resin; and
   a non-tacky tab.

2. The tape of claim 1, wherein said silicone polyurea block copolymer comprises the reaction product of
   i) a polydiorganosiloxane diamine having a molecular weight of at least 5,000 g/mole,
   ii) a polyamine, and
   iii) a polyisocyanate.

3. The tape of claim 2, wherein the polyamine has a molecular weight no greater than 300 g/mole.

4. The tape of claim 2, wherein said polydiorganosiloxane diamine has a molecular weight of from about 10,000 g/mole to about 65,000 g/mole.

5. The tape of claim 2, wherein said polydiorganosiloxane diamine has a molecular weight of from about 25,000 g/mole to about 50,000 g/mole.

6. The tape of claim 2, wherein said silicone polyurea block copolymer comprises the reaction product of
   i) a. polydiorganosiloxane diamine having a molecular weight of from about 10,000 g/mole to about 65,000 g/mole,
   ii) no greater than 3 moles polyamine, and
   iii) a polyisocyanate.

7. The tape of claim 2, wherein said silicone polyurea block copolymer comprises the reaction product of
   i) a polydiorganosiloxane diamine having a molecular weight of from about 10,000 g/mole to about 65,000 g/mole,
   ii) from about 0.25 moles to 2 moles polyamine, and
   iii) a polyisocyanate.

8. The tape of claim 2, wherein said pressure sensitive adhesive composition comprises from about 40% by weight to about 60% by weight MQ resin.

9. The tape of claim 2, wherein said pressure sensitive adhesive composition comprises from about 45% by weight to about 55% by weight MQ resin.

10. The tape of claim 1, wherein said pressure sensitive adhesive composition comprises from about 40% by weight to about 60% by weight MQ resin.

11. The tape of claim 1, wherein said pressure sensitive adhesive composition comprises from about 45% by weight to about 55% by weight MQ resin.

12. The tape of claim 1 wherein said pressure sensitive adhesive composition has a modulus at 1 radian/second and −17° C. of no greater than about 5×10$^6$ Pa.

13. The tape of claim 1 wherein said pressure sensitive adhesive composition has a modulus at 1 radian/second and −17° C. of no greater than about 2×10$^6$ Pa.

14. The tape of claim 1 wherein said pressure sensitive adhesive composition exhibits a 180° peel strength on a glass substrate at 98% relative humidity of at least about 21.9 N/dm.

15. The tape of claim 1 wherein said pressure sensitive adhesive composition exhibits a 180° peel strength on a glass substrate at 98% relative humidity of at least about 32.8 N/dm.

16. The tape of claim 1, wherein said tape comprises a pressure sensitive adhesive foam.

17. The tape of claim 1, wherein said tape further comprises a backing, said pressure sensitive adhesive composition being disposed on said backing.

18. The tape of claim 17, wherein said backing is selected from the group consisting of elastic backings, highly extensible backings, and substantially inelastic backings, and combinations thereof.

19. The tape of claim 17, wherein said backing comprises a film selected from the group consisting of single layer, multi-layer, woven, non-woven, porous, and combinations thereof.

20. The tape of claim 17, wherein said backing comprises a layer of polymeric film and a layer of polymeric foam.

21. The tape of claim 17, wherein said backing comprises a layer of foam, a first film disposed on a first surface of said foam and a second film disposed on a second surface of said foam.

22. The tape of claim 17, wherein said backing comprises a treated surface, said pressure sensitive adhesive composition being disposed on said treated surface and exhibiting a greater adhesion to the treated backing relative to an untreated backing.

23. The tape of claim 17, further comprising a primer composition disposed between said pressure sensitive adhesive composition and said backing.

24. The tape of claim 17, wherein a pressure sensitive adhesive composition is disposed on a first major surface of said backing and a second major surface of said backing opposite said first major surface.

25. The tape of claim 1, wherein when a first substrate is bonded to a second substrate through said stretch releasing pressure sensitive adhesive tape, said stretch releasing pressure sensitive adhesive tape is capable of completely separating from one of said first substrate or said second substrate prior to completely separating from the other of said first substrate or said second substrate.

26. An assembly comprising:
   a device for holding an article; and
   the stretch releasing pressure sensitive adhesive tape of claim 1 disposed on a surface of said device.

27. The assembly of claim 26, wherein said device is capable of holding an article selected from the group consisting of razor, bottle, bar of soap and combinations thereof.

28. A method of removably bonding the assembly of claim 26 to a substrate, said method comprising
   contacting the substrate with said stretch releasing pressure sensitive adhesive tape such that said device is bonded to said substrate through said stretch releasing pressure sensitive adhesive tape and said non-tacky tab is available for grasping by a user.

29. The method of claim 28, wherein said substrate is selected from the group consisting of glass, ceramic, porcelain and combinations thereof.

30. The method of claim 28, wherein said substrate is in a location selected from the group consisting of a refrigerator and a portable cooler.

31. The method of claim 28, further comprising pulling said tab such that said pressure sensitive adhesive tape stretches and releases from at least one of said device and said substrate.

32. A kit comprising:
  a device for holding an article; and
  the stretch releasing pressure sensitive adhesive tape of claim 1, said tape being capable of forming a bond to a surface of said device and to a substrate.

33. The kit of claim 32, wherein, when said device is bonded to a substrate through said stretch releasing pressure sensitive adhesive tape, said stretch releasing pressure sensitive adhesive tape being capable of completely separating from one of said device or said substrate prior to completely separating from the other of said device or said substrate.

34. A multi-layer stretch releasing pressure-sensitive adhesive tape comprising:
  a) a backing comprising a foam substrate;
  b) a first pressure-sensitive adhesive composition disposed on a first surface of said backing, said first pressure sensitive adhesive composition having a modulus at 1 radian/second and $-17°$ C. of no greater than about $1 \times 10^7$ Pa and comprising
    wa') a silicone polyurea block copolymer comprising the reaction product of
      i) a polydiorganosiloxane diamine having a molecular weight of at least 5,000 g/mole,
      ii) a polyisocyanate, and
    b') from about 30% by weight to about 70% by weight MQ resin; and
  c) a second pressure-sensitive adhesive composition disposed on a second surface of said backing and
  d) a non-tacky tab.

* * * * *